United States Patent
Moore et al.

(10) Patent No.: US 6,357,374 B1
(45) Date of Patent: Mar. 19, 2002

(54) METHOD AND APPARATUS FOR INCREASING THE EFFECTIVENESS AND EFFICIENCY OF MULTIPLE BOUNDARY LAYER CONTROL TECHNIQUES

(75) Inventors: Kenneth J. Moore, Great Falls; Thomas D. Ryan, McLean, both of VA (US); Vladimir A. Gorban; Victor V. Babenko, both of Kiev (UA)

(73) Assignee: Cortana Corporation, Falls Church, VA (US)

( * ) Notice: Subject to any disclaimer, the term of this patent is extended or adjusted under 35 U.S.C. 154(b) by 0 days.

(21) Appl. No.: 09/621,611

(22) Filed: Jul. 21, 2000

(51) Int. Cl.$^7$ .................................. B63B 1/38
(52) U.S. Cl. ...................... 114/67 A; 244/130
(58) Field of Search .................. 114/67 A; 137/13; 244/207, 130

(56) References Cited

U.S. PATENT DOCUMENTS

| | | | |
|---|---|---|---|
| 3,289,623 A | * | 12/1966 | Gray et al. |
| 3,732,839 A | * | 5/1973 | Schuster et al. |
| 4,186,679 A | * | 2/1980 | Fabula et al. |
| 4,214,722 A | * | 7/1980 | Tamura |
| 4,987,844 A | * | 1/1991 | Nadolink |
| 5,445,095 A | * | 8/1995 | Reed et al. |
| 6,138,704 A | * | 10/2000 | Babenko |
| 6,237,636 B1 | | 5/2001 | Babenko |

FOREIGN PATENT DOCUMENTS

SU       1585569       4/1988

OTHER PUBLICATIONS

Patent Abstracts of Japan, published by the EPO: Pub. No. 09151914 dated Oct. 6, 1997.
Patent Abstracts of Japan, published by the EPO: Pub. No. 09151913 dated Oct. 6, 1997.
Chang, Paul K, Control of Flow Separation, pp. 352, 353, 367, 432, 433, and 442 –445, McGraw–Hill, Washington, D.C., 1976.

* cited by examiner

Primary Examiner—Sherman Basinger
(74) Attorney, Agent, or Firm—Arnold International; Bruce Y. Arnold

(57) ABSTRACT

In an apparatus and method for ejecting an additive for significantly reducing the drag of a first fluid moving relative to a wall, a drag-reducing substance is conditioned by causing a second fluid, which includes the drag-reducing substance as a dispersed solid, liquid or gas, to flow through a nozzle. The second fluid is then passed by a vortex chamber prior to ejection of the second fluid into the first fluid via an aperture that includes a Coanda surface on a portion thereof. Additional techniques are also disclosed which increase the effectiveness and efficiency of ejecting a drag-reducing substance into a fluid that is moving relative to a wall, and which thus enable multiple layers to be established without the undesirable disruption of the boundary layer and without the rapid diffusion of the additives across the boundary layer that occur in prior art ejection techniques.

32 Claims, 4 Drawing Sheets

METHOD AND APPARATUS FOR INCREASING THE EFFECTIVENESS AND EFFICIENCY OF MULTIPLE BOUNDARY LAYER CONTROL TECHNIQUES

TECHNICAL FIELD

This invention relates to a much more efficient method and apparatus to reduce the drag of plates or vessels moving relative to a fluid and of internal flows such as liquids moving through marine water-jet propulsors. The invention can be used to eject additives into specific regions of the boundary layer to modify the rheological properties of the fluid without the undesirable disruption of the boundary layer and without the rapid diffusion of the additive across the boundary layer inherent in traditional ejection techniques.

BACKGROUND ART

In the past, the effectiveness and efficiency of drag reduction obtained by ejecting non-Newtonian additives in "external" turbulent boundary layer flows has been limited relative to the effectiveness and efficiency observed in "internal" or pipe flows. In high Reynolds number turbulent pipe flows, reductions in friction drag of 70 to 80 percent are observed, while for ejection into high Reynolds number turbulent flows over a flat-plate, the maximum observed reduction in friction drag has been only about 40 to 60 percent. Further, the high additive expenditure rates experienced for external boundary layers have limited the economic benefit of implementing additive systems on maritime transport craft. Ejection techniques to introduce additives into external flows also have introduced unsteadiness and, in some cases, unfavorable viscosity gradients into the boundary layer, such that the penalties associated with the ejection process resulted in a greatly reduced net benefit. A more efficient method for introducing additives into the near-wall region of the boundary layer for drag reduction is needed.

In the prior art, advances were directed toward additive mixing or bubble generation and little attention was given to the ejector itself. U.S. Pat. No. 4,186,679 to Fabula et al (which issued Feb. 5, 1980), is representative of the modest attention paid to the ejector system itself. In this case, the ejector is identified as "a plurality of rearwardly raked ejection apertures." Similarly, in U.S. Pat. No. 4,987,844 to Nadolink (which issued Jan. 29, 1991), the focus is on methods and apparatus to pump solvent passively, to mix multiple additives or suspensions, and to direct the mixture to the location of minimum pressure coefficient for ejection. The ejection apparatus is only identified as being one of many options, specifically "either screening, mesh, a porous media, perforated material, drilled holes of specific geometry, a circumferential slot, etc., " and that "other forms of ejection apparatus . . . may be employed to achieve the result of the present invention." In U.S. Pat. No. 5,445,095, by Reed et al (which issued Aug. 29, 1995), longitudinal riblets are combined with polymer ejection to predictably control the rate of diffusion of the polymer. However, the maximum downstream distance at which the material has completely diffused away from the riblets was identified as about 400 riblet widths, which scales to the order of centimeters for a marine vehicle, while the diffusion distance for the present invention has been shown to be on the order of tens of meters. As with the other inventions, no specific ejection technique is identified; only a series of "feasible" methods are listed. In Japanese Laid Open Patent Applications 09 151913 and 09 151914 by Mitsutake Hideo and Yoshida Yuki, respectively, both published 29-11-95, air bubbles are distributed along the submerged surface of a ship to reduce drag. In the first laid open patent application the ejectors are simply straight tubes, one for air bubbles and one upstream for a liquid. The purported purpose of the upstream "high kinetic energy" ejector is to entrain the air bubbles from the downstream ejector on the inside of the boundary layer near the submerged surface. The second laid open patent application is entitled "Microbubble Generator", but a key component is a backwards (upstream) slanting flexible bubble generator with a sinusoidal fluid path. The ejection port is the outlet of the bubble generator, which faces upstream against the flow. The effects with regard to ejecting additives against the flow or disrupting the established boundary layer with a high-energy wall jet are not addressed.

A classical discussion of boundary layer theory, including formulation of Navier-Stokes and turbulent boundary layer equations, is provided in *Boundary-Layer Theory*, by Dr. Hermann Schlichting, published by McGraw Hill, New York, seventh edition, 1979. A discussion of structures and scales in turbulent flows can be found in *Turbulence*, 1975, McGraw Hill, written by J. O. Hinze, and in "Coherent Motions in the Turbulent Boundary Layer," in *Annual Review of Fluid Mechanics*, 1991, Volume 23, pp. 601 to 639, written by Steven K. Robinson. The potential of dilute aqueous solutions of long-chain polymer molecules to reduce drag, now known as the Toms' Effect, was introduced by B. A. Toms at the First International Congress on Rheology in Amsterdam in 1948 and was published in the proceedings of that conference. P. S. Virk et al introduced the concept of drag reduction limits with polymer solutions in turbulent pipe flows in a paper entitled, "The Ultimate Asymptote and Mean Flow Structures in Toms' Phenomenon," published in the *ASME Journal of Applied Mechanics*, 37, pages 488 to 493, in 1970. Virk et al related the level of drag reduction to an increase in the thickness of the buffer zone which, in turn, was limited by the pipe diameter. For external flows, no such physical constraint is imposed. However, D. T. Walker, his professor W. G. Tiederman, and colleague T. S. Luchik, in a paper entitled, "Optimization of the ejection process for drag-reducing additives," which was published in *Experiments in Fluids*, 4, pages 114 to 120, in 1986, obtained drag reduction limits for slot ejection in a channel flow were 20 to 40 percent less than the maximum drag reduction observed in pipe flows. These observations were confirmed by others, such as Yu. F. Ivanyuta and A. A. Khomyakov in their article on the "Investigation of Drag Reduction Effectiveness with Ejection of Viscoelastic Polymer Solutions," which was published in the *Proceedings of the International Shipbuilding Conference*, KRSI, October, 1994, St. Petersburg, pages 163 to 170, in Russian.

While dilute solutions of polymer behave as Newtonian fluids in laminar flows, A. Gyr and H. W. Bewersdorff, in their text, *Drag Reduction of Turbulent Flows by Additives*, Kluwer Academic Publishers, 1995, point out that in certain laminar flows, such as laminar contraction flows, polymer solutions exhibit non-Newtonian behavior. The hypothesis cited is that in such a flow, as in turbulent flow, the long molecules of the additive become stretched (uncoiled and elongated) and aligned in the flow which are necessary conditions for the solution to exhibit non-Newtonian behavior. V. G. Pogrebnyak, Y. F. lvanyuta, and S. Y. Frenbel, in their paper, "The Structure of the Hydrodynamic Field and Directions of the Molecular Slope of Flexible Polymers Under Free-Converging Flow Conditions" published in Russian in *Polymer Science USSR*. Vol. 34, No. 3, 1992, define the conditions under which the polymer molecules can be uncoiled, aligned, and sufficiently stretched to become effective in drag reduction.

Experiments by C. S. Wells and J. G. Spangler, described in their paper, "Injection of a Drag-reducing Fluid into Turbulent Pipe Flow of a Newtonian Fluid" published in *The Physics of Fluids*, Vol. 10, No. 9, pages 1890 to 1894, September, 1967, by M. M. Reischman and W. G. Tiederman described in an article, "Laser-Doppler Anemometer Measurements in Drag-reducing Channel Flows," published in the *Journal of Fluid Mechanics*, Vol. 70, Part 2, pages 360 to 392, in 1975, and by W. D. McCombs and L. H. Rabie in "Local Drag Reduction Due to Injection of Polymer Solutions into Turbulent Flow in a Pipe," Parts I and II, published in the *AIChE Journal*, Vol. 28, No. 4, pages 547 to 565, in July 1982, have clearly demonstrated that polymer additives can reduce drag when they are in the near-wall region of the turbulent boundary layer, known as the buffer zone. In viscous wall units, hereinafter termed y+, which are length values non-dimensionalized with friction velocity and kinematic viscosity, the region was between about 20 and 100 viscous wall units from the wall. It has been noted that at high levels of drag reduction, the buffer zone is thickened and can extend out to several hundred viscous wall units. No drag reduction or related effects were observed when polymer was confined to the region where viscous shear stresses dominate over Reynolds stresses, that is, inside of about 12 viscous wall units. The convention used in the literature is a $y^+$ value of 11.6. As shown by many, including A. A. Fontaine, H. L. Petrie, and T. A. Brungart in their paper "Velocity Profile Statistics in a Turbulent Boundary Layer with Soft-Injected Polymer," published in the *J. Fluid Mechanics*, Vol. 238, pages 435 to 466 in 1992, the flow through this region per unit span, $Q_s$, is equal to 67.3 times the kinematic viscosity of the fluid. For a given fluid and fluid temperature, this flow rate is independent of freestream velocity and distance from the beginning of the boundary layer.

While the sensitivity of drag reduction to additive location within the boundary layer has been recognized since 1967, the elegant work of M. Poreh and J. E. Cermak regarding the "Study of Diffusion from a Line Source into a Turbulent Boundary Layer," published in the *Int. Journal Heat & Mass Transfer*, No. 7, in 1964, convinced most researchers that diffusion of the ejected fluid was inevitable and rapid. Thus, as reported by J. W. Hoyt and A. G. Fabula "Frictional Resistance in Towing Tanks," published in the *Proceedings of 10$^{th}$ Industrial Towing Tank Conference*, at Teddington England, in 1963, by T Kowalski on "The Effect in Resistance of Polymer Additives Injected into the Boundary Layer of a Frigate Model," published in the *Transactions of the Eleventh International Towing Tanks Conference of Ship Tank Superintendent*, at Tokyo, in 1966, by H. L. Dove and H. J. S Canham on the *HMS Highburton Speed Trials with Polyox Injection into the Boundary Layer*, published in AEW Report No 11/69, by, W. Xiliang, D. Yongxuan, X. Changsheng, and W. Guigin in "Drag Reduction by Polymer Ejection Described," published in *Shipbuilding of China*, No. 66, page 45 to 57 in July, 1980, and by researchers in the Soviet Union as described by B. F. Dronov and B. A. Barbanel in their paper "Early Experience of BLC Techniques Usage in Underwater Shipbuilding," published in the *Proceedings of Warship 99. Naval Submarine 6*, by the Royal Institute of Naval Architects, London in June, 1999, the investigators used a wide array of angled slots or circular apertures to eject sufficient material to flood the entire boundary layer. Because of the acceptance of rapid diffusion, not only through but even outside the boundary layer, the amount of material ejected was often several times that calculated to flood the entire boundary layer at its greatest extent. Ejection velocities were usually of the same order as the free-stream velocity and ejected mass flow rates often exceeded 100 $Q_s$.

In the paper, "Suppressed Diffusion of Drag-reducing Polymer in a Turbulent Boundary Layer," published in the *Journal of Hydronautics*, No. 6 in 1972, J. Wu, and then D. Collins in his thesis entitled, "A Turbulent Boundary Layer with Slot Injection of Drag-reducing Polymer," at the Georgia Institute of Technology in July, 1973, first reported a lower diffusion rate for polymer solutions than was generally accepted. In 1989, D. T. Walker and W. G. Tiederman confirmed those observations in their papers "Simultaneous Laser Velocimeter and Concentration Measurements," published in the *Journal of Laser Applications* 1, pages 44 to 48 in 1989, and "The Concentration Field in a Turbulent Channel Flow with Polymer Injection at the Wall," published in *Experiments in Fluids*, 8, pages 86 to 94 in 1989. In the early 1990s there was growing recognition that the Poreh and Cermak work, held as the standard for diffusion behavior, could be applied only to the introduction of "passive" contaminants into the turbulent flows. Specifically, "active" contaminants, such as aqueous solutions of high molecular weight polymers, that affect the character of turbulence and, hence, the process of diffusion, do not behave the same: diffusion can be more gradual. This was confirmed by T. A. Brungart, L. L. Petrie, W. L. Harbison, and C. L. Merkle in their work using "A Fluorescence Technique for Measurement of Slot-injected Fluid Concentration Profiles in a Turbulent Boundary Layer," and published in *Experiments in Fluids*, 11, in 1991. The next year S. T. Sommer and H. L. Petrie published "Diffusion of slot-injected drag-reducing polymer solution in a LEBU-modified turbulent boundary layer" in *Experiments in Fluids*, 12, in which they demonstrated, in relatively high-speed flows, that control or modification of the outer flow field at the ejection slot with a pair of large-eddy break-up devices (LEBUs), further reduced the rate of polymer diffusion across the boundary layer. Further, A. A. Fontaine, H. L. Petrie, and T. A. Brungart in their paper, "Velocity Profile Statistics in a Turbulent Boundary Layer with Slot-injected Polymer," published in the *Journal of Fluid Mechanics*, 238, pages 435 to 466 in 1992, showed that a reduction in the mass flow rate of the ejected fluid by a factor of two and a doubling of the concentrations to maintain a constant polymer expenditure rate produced a further reduction in the diffusion rate.

W. B. Amfilokhiev, B. A. Barbarnel, and N. P. Mazaeva in their paper on "The Boundary Layer with Slot Injection of Polymer Solutions," prepared for the Tenth European Drag Reduction Working Meeting, Mar. 16 to 17, 1997, point out that experience had demonstrated that a single slot with very high concentration was superior to the same amount or more additive being ejected from multiple slots along the length of the vessel. This empirically based insight was validated by Tiederman, Luchik, and Bogard in their work represented in "Wall-Layer Structure and Drag Reduction," published in the *Journal of Fluid Mechanics*, Vol. 156, page 419 to 437 (1985), where they showed that ejection at even modest discharge rates was disruptive to the boundary layer and resulted in an increase in the local skin friction drag, upstream, at, and just downstream of the ejection site. W. M. Kays and M. E. Crawford in their text on *Convective Heat*

*and Mass Transfer*, published by McGraw-Hill, Inc. (1993), third edition, pages 226 to 230, point out that when the ratio of the mass flux of a second or ejected fluid normal to the mass flux of the freestream or first fluid exceeds 0.01, the boundary layer "is literally blown off the wall surface."

A good summary of their own research, as well as the research of other experimenters with gas injection, is presented by C. L. Merkle and S. Deutsch in their article, "Drag Reduction in Liquid boundary Layers by Gas Injection." The article is included in the text, *Viscous Drag Reduction in Boundary Layers*, edited by D. M. Bushnell and J. N. Hefner, Vol. 123, pages 351 to 410, and was published in 1990.

Allowed U.S. patent application Ser. No. 09/223,783 entitled "Method for Reducing Dissipation Rate of Fluid Ejected Into a Boundary Layer", which was filed on Dec. 31, 1998, and which issued as U.S. Pat. No. 6,138,704, describes a method to introduce ordered vorticity upstream of and in the ejected drag-reducing fluids. Controlled and favorable vorticity is employed to keep the ejected fluid in the near-wall region and to orient the molecules or structures of the additive in the configuration in which they are most effective.

A discussion and experimental results of providing a positive or favorable viscosity gradient in the near-wall region of the boundary layer is available in the paper by J. Kato, Y. Fujii, H. Yamaguchi, and M. Miyanaga entitled, "Frictional Drag Reduction by Injecting High-viscosity Fluid into a Turbulent Boundary Layer," published in *Transactions of the ASME*, 115, pages 206 to 211, in June, 1993. The adverse effect of producing a negative viscosity gradient when ejecting polymer was identified in the previously identified paper by C. S. Well and J. G. Spangler (1967) and in papers by J. Wu and M. Tulin, such as "Drag Reduction by Ejecting Additive Solutions into a Pure Water Boundary Layer," which was published in the *Transactions of the ASME, Journal of Basic Engineering*, in 1972. In their previously cited 1994 paper (in Russian), Yu. F. Ivanyuta and A. A. Khomyakov present a theoretical argument that a positive viscosity gradient will promote stabilization in laminar flow. They then present results from a series of experiments in turbulent flow in which they purport to establish a favorable viscosity gradient by using a special ejector. No geometry of the ejection system and no details of the method to achieve the favorable viscosity gradient were presented, but the plotted results indicated that the reduction in towed resistance was increased from about 50 percent to about 70 percent on their very long (40 m), but small-diameter (0.4 m), body. They also reported that their measurements of local drag reduction indicated a constant improvement (greater drag reduction), relative to their previous ejection method, along the length of the towed body.

Quite separate from using additives for boundary layer control, there are techniques to retard or eliminate flow separation which otherwise would lead to increased drag. F. 0. Ringleb described the potential for "Separation Control by Trapped Vortices" in the text *Boundary Layer Control*, Vol. 1, G. V. Lachmann, editor, published by Pergamon Press in 1961, as well as in a "Discussion of Problems Associated with Standing Vortices and their Applications," presented at the ASME Symposium on Fully Separate Flows in Philadelphia, Pa. on May 18 to 20, 1964. The concept is to provide an abrupt change in configuration geometry in a region where the flow path is otherwise continuous, but where separation would be expected on the continuous surface or wall. An abrupt change in geometry, such as produced by a transverse groove, can produce a strong vortex in the groove. Thus, the attached flow above the vortices bridges over the groove and remains attached downstream. This technique of producing stable entrained vorticity has been used to avoid or reduce an extended wake of separated flow. Sometimes referred to as Ringleb vortices, they are often used in diffusers and at the base of blunt bodies.

Discussions of wall jets to control separation of incompressible turbulent flow can be found in *Control of Flow Separation* by Paul K. Chang, published by Hemisphere Publishing Corporation, in 1976. Jets of the same fluid as in the freestream are used to entrain the freestream flow in regions of an adverse pressure gradient. The concept is to use the excess momentum of the wall jet to offset the loss of boundary layer momentum resulting from skin friction. However, without a careful balance of the two effects, the benefit can be diminished or even reversed by the increase in wall shear stress produced by the jet. Mixing is enhanced because of the unsteadiness introduced into the boundary layer by the jet. A. I. Tcygan'uk, L. F. Koziov, V. N. Vovk, and S. L. Maximov described a method and device to reduce the unsteadiness introduced by a wall jet in their invention entitled, "Technique for Control of the Near-wall Layer Flowing Over a Hard Body by the Method of a Control Jet and a Device for Realization of this Technique," which was published in *Bulletin* #30 of Aug. 15, 1990, as Soviet Inventor's Certificate Number S.U. 1585569 A1. This method and device differ from other wall jet systems intended to entrain the boundary layer because of the creation of a vortex zone in the region where the control jet joins the freestream flow. The invention claims the vortex zone is produced by a vortex chamber when it has an opening to the jet that is approximately 0.28 of the length of the chamber.

BRIEF SUMMARY OF THE INVENTION

The present invention enables the non-disruptive ejection of fluids into selected strata of the near-wall region of the boundary layer of a fluid flow. As its first objective, the present invention preconditions the upstream flow to reduce the initial diffusion of additive when it merges with the boundary layer flow. The second object of the invention is to precondition the ejected stream and the additive within the ejected stream such that it is immediately effective in reducing turbulent diffusion and the loss of momentum within the ejected fluid as it enters the boundary layer. A third object of the invention is to inhibit undesirable disruption of the established flow field. A fourth object of the invention is to eliminate the unfavorable viscosity gradient inherent in the ejection of high concentrations of a non-Newtonian additive or gas-liquid mixture; the fifth object of the invention is to allow the selective placement of multiple additives in strata across the boundary layer; the sixth object is to place additive or flow structure at specific locations above the near-wall flow to shield the near-wall flow, thereby further reducing the diffusion of ejected additives. The seventh object of the invention is to permit multiple ejector sets to be located along the length of the plate or vessel to maintain an optimum concentration of material, thereby enhancing overall system efficiency.

The boundary layer control system of the present invention includes pre-ejection processes, ejection processes, and post-ejection processes. The pre-ejection processes relate to conditioning the upstream flow to reduce the level of initial diffusion before the additive can take full effect. The ejection processes include conditioning of and directing the ejected fluid to accelerate the effect of the additive in reducing the turbulent diffusion at the ejector and inhibit the introduction of unsteadiness into the boundary layer, both upstream and downstream of the ejection point. The mass flow rate of the ejected fluid is selected based on the near-wall flow parameters of the established boundary layer in order to avoid an undesirable increase in the level of turbulence.

Since the ejection process is much less disruptive, multiple ejection locations can be implemented simultaneously without the penalties observed with traditional additive ejection techniques. Further, individual ejectors can be placed immediately adjacent to each other to allow ejection of multiple additives into selected strata of the downstream boundary layer, thereby providing for the control of rheological characteristics of the boundary layer, such as establishing and maintaining a favorable viscosity gradient after ejection. The ejection apparatus comprises a unique arrangement of fluidics devices including transverse grooves, vortex chambers, Coanda surfaces, internal nozzles, and knife-edges.

As used herein a "Coanda" surface refers to a convex-shaped, curved surface which produces a Coanda effect on a stream of flowing liquid. The Coanda effect refers to a wellknown fluid-dynamic phenomenon whereby a fluid with momentum due to its velocity will follow a curved surface contour, approximately as would an inviscid fluid. This flow will be maintained as long as a balance exists between the pressure gradient normal to the surface and a force, commonly termed "centrifugal force", resulting from flow of the fluid around the convex-shaped, curved surface. The balance between these two forces is normally destroyed by the thickening of the boundary layer and the dynamic pressure of the free stream. Thus, a surface that is specially designed to have its convex curvature vary according to well-known criteria so as to produce a Coanda effect on an adjacent flowing fluid is hereinafter termed a "Coanda surface".

The present invention is different from all previous additive ejectors in that it substantially reduces the vorticity introduced on the upstream and downstream edge of the ejector. It conditions the upstream flow to reduce the level of turbulence and, hence, diffusion at the ejector. It preconditions the additive so that it is unwound, aligned, and stretched before merging with the external boundary layer flow. And, it conditions the downstream flow by keeping bubbles off the wall and establishing a favorable viscosity gradient at the wall immediately downstream of the polymer ejector. No ejection system of the prior art enables the non-disruptive placement of multiple additives in specific strata of the near-wall region of the boundary layer, as in the present invention.

BRIEF DESCRIPTION OF THE DRAWINGS

The present invention will become more fully understood from the detailed description given below. The accompanying drawings are given by way of illustration only, and thus are not limitative of the present invention wherein:

FIG. 2A shows the profile of an elliptically shaped groove. FIG. 2B shows the profile of a groove which can be fed an additive through a nozzle with a Coanda surface at the bottom downstream corner of the groove. FIG. 2C shows the profile of a groove which can be fed an additive through a nozzle at the top upstream edge of the groove.

DETAILED DESCRIPTION

The present invention is based on the recognition that the level and efficiency of drag reduction achieved with slot ejection of additives represents a net value of both the favorable and unfavorable effects of the ejection-related processes. This invention avoids or suppresses the unfavorable effects and accelerates the initiation of and prolongation of the favorable effects, thereby increasing the value of drag reduction achievable and reducing the volume expenditure rate of additive. The negative effects of ejection of high concentrations of polymer solutions and mixtures with gas microbubbles are the introduction of additional unsteadiness in the boundary layer in the local region around the ejector, an increase in level of turbulence, and the development of an unfavorable viscosity gradient in the wall region. These effects contribute to an increase in local drag and to more rapid diffusion of the additive out of the region of the boundary layer where it is effective. Specifically, the invention limits, rather than contributes, to diffusion of the additive away from the buffer zone of the boundary layer.

To reduce the disruption of the established boundary layer and the rapid diffusion of ejected additive, the ejector of the present invention exploits a unique combination of fluidics-based configurations. The configurations include a nozzle at the base or "throat" of the ejector with an exit diameter 14 (identified hereinafter as $h_1$ for the purpose of scaling all other elements of the ejector), a Coanda surface on the downstream side of the ejection stream, a vortex chamber on the upstream side of the ejection stream, and two knife-edges, one where the ejection stream meets the vortex chamber and the second where it meets the established boundary layer flow. The second knife-edge can be replaced by a surface having a small radius of curvature to facilitate produceability and maintainability of this component, without sacrificing performance.

Figure 1:
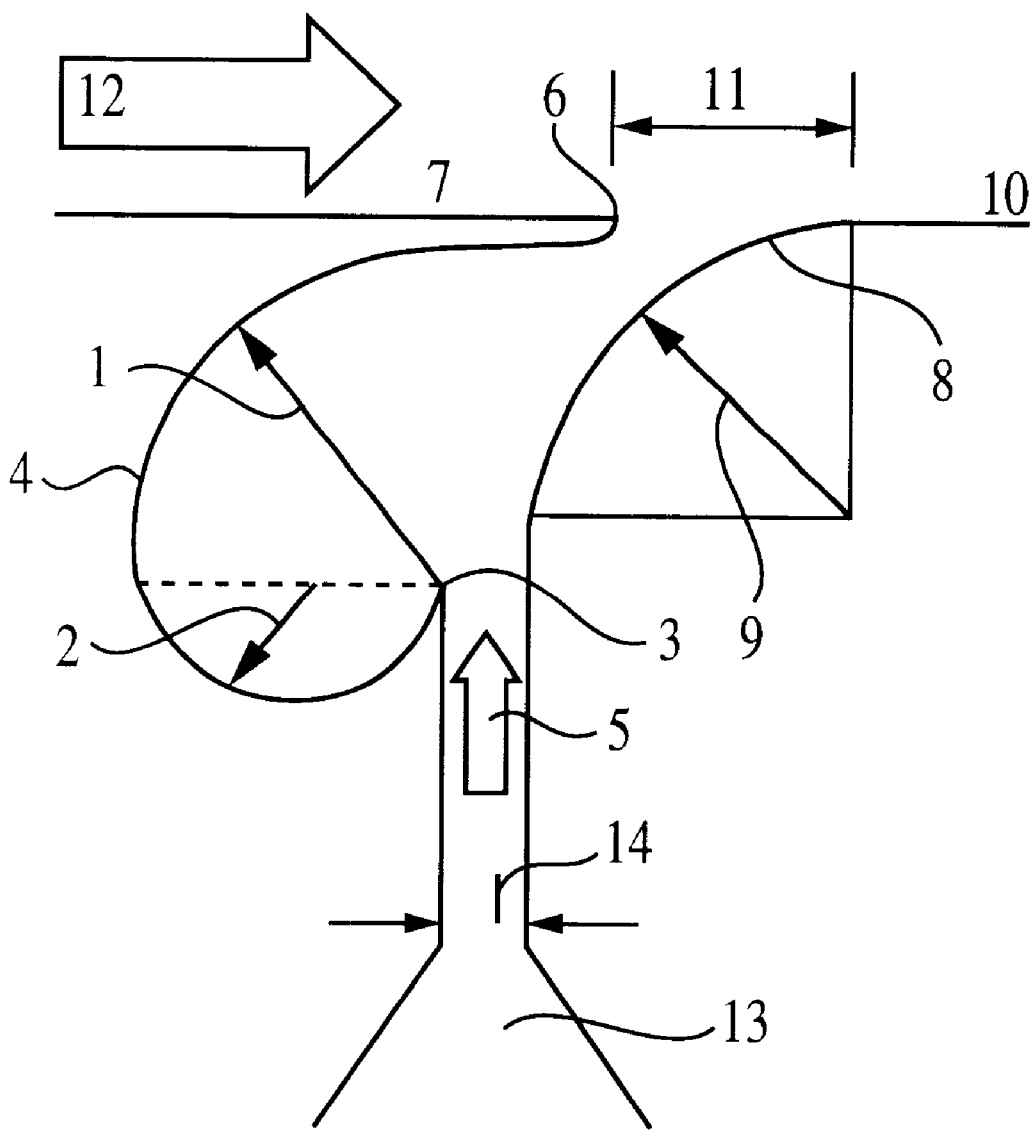
FIG. 1 is a schematic of a basic ejector element of the ejection system.

FIG. 1 is a schematic of a basic ejector element of the ejection system. It includes a nozzle (13) which preconditions the additive, a vortex chamber (4) on the upstream side of the element and which has form and scale defined by two radii, (1) and (2), a knife-edge (3) where the chamber (4) and ejection stream intersect (5), either a knife-edge or a surface having a radius of curvature (6) sufficiently large to have the effect of a Coanda surface at the location where the chamber (4) and outer wall intersect (7), a Coanda surface (8) of radius (9) on the downstream edge of the ejector which connects to the outer wall (10), and an aperture (11) through which the ejected stream (5) joins the established boundary layer flow (12). In situations where there are constraints on the geometry of the ejector, the Coanda surface (8) may have a compound radius in lieu of a fixed radius. At the inlet of the ejector is a nozzle (13) or other device that produces a convergent flow into the ejector stream (5). The ejection stream has a width that equals $h_1$. The purpose of the nozzle is to establish a laminar contraction flow sufficient to uncoil, align, and stretch the additive molecules such that they are in the condition necessary to be effective. The flow through the ejector will be laminar, since the ejection velocity should be about ten percent of the freestream velocity and the ejector should be sized to accommodate mass flow rates of 10 $Q_s$. The mass flow rate may vary by a factor of about two, larger or smaller, and will depend upon the length and character (e.g., roughness and viscoelastic properties) of the wall being treated, the freestream velocity, the type and concentration of additive, and the level of drag reduction desired. The range of these parameters for most commonly used additives will result in laminar flow through the ejector. The velocity of the ejected fluid stream is bound on the low end by the value sufficient to keep the ejected stream attached to the Coanda surface (8). It is bound on the upper end by the velocity of the near-wall boundary layer flow that is displaced by the ejected stream. By not exceeding that velocity, the two flows can merge without producing a significant increase in the local level of turbulence. The desired mass flow rate and ejection velocity determine the nozzle or slot width $h_1$. By using a properly configured nozzle, the additive will be effective immediately upon merging with the boundary layer and thus begin to affect the level of turbulence, which is the principal mechanism of diffusion in a turbulent boundary layer. The concentration of the additive is, of course, greatest at the point of ejection. Thus, reduction in the level of turbulence at this location is critical to diffusion control and maximizing the effect of the volume of additive ejected. As described in the literature, a nozzle with a length of order ten millimeters and an angle of about 10 to 45 degrees between the nozzle walls has been shown to be adequate to precondition the additive at mean flow rates through the nozzle of about one meter per second for polymers such as Polyox WSR-301.

As described below, the Coanda surface and vortex chamber function as a unit. The purpose of the Coanda surface is to keep the ejected stream attached to the downstream external wall. When polymer additive is ejected, the value of the radius of the Coanda surface (9) should be about 4 $h_1$. Eliminating the separation region at the downstream edge of the ejector avoids the unsteadiness introduced by such separation, which is inherent in traditional slot designs.

The velocity component of the ejected stream normal to the boundary layer is reduced to near-zero because of the Coanda surface and low mass flow rate. By eliminating boundary layer "blow-off," the increase in pressure drag and the rapid diffusion of ejected additive associated with that phenomena are avoided.

The purpose of the vortex chamber, located on the upstream side of the ejector, is to reduce or eliminate sources of vorticity that otherwise would contribute to the disruption of the established boundary layer, thereby increasing local drag and enhancing the rate of additive diffusion across the boundary layer. The shape of the chamber is defined by two radii, (1) and (2). The center point for (1) is the tip of knife-edge (3) and the value of (1) is approximately 4 $h_1$. The center of (2) is midway along a line extended from knife-edge (3) to the opposite wall of the chamber. When (2) is one half the length of (1), the two curves will provide a continuous surface. While that 2:1 ratio need not be precise, variations from that ratio will require a short wall segment to avoid any discontinuity or inflection point in the profile of the chamber. The top of the chamber is formed with a tangent connecting knife-edge (6) to the surface formed by (1). As mentioned above, the knife-edge at (6) can be replaced by a small curved surface to facilitate manufacture and increase the strength of the wall. If the curvature is sufficient to keep the flow attached until it merges with the free stream flow, there will be no degradation in ejection performance. For the parameters associated with full-scale marine applications, the radius of that curve should be about 0.5 $h_1$ with its center on the outer wall, such that the dimension of the opening (11) to the established boundary layer (12), is about $3h_1$.

The presence of an internal vortex chamber on the upstream wall modifies the behavior of the flow relative to the flow in a curved channel and eliminates the vortices otherwise introduced by the curvature of the upstream wall. Neither Dean-type nor Goertler-type vortices are formed. The motion of the ejected stream induces circulation in the vortex chamber. For a properly formed and scaled chamber, a stable vortex is established within the chamber. The boundary layer on the upstream boundary of the ejected stream does not continue to develop. Rather, vorticity, which is produced by the internal wall upstream of the chamber, is dissipated by the vortex entrained in the chamber. The velocity profile of the ejected stream is modified relative to established channel flow such that the flow along the upstream edge of the internal stream is slowed less than without the vortex chamber, thereby producing a more stable layer of ejected fluid as it merges with the near-wall region of the established boundary layer. Hence, the unsteadiness introduced into the boundary layer at the upstream edge of the ejected stream is reduced.

Without the vortex chamber, the curvature necessary to form the Coanda surface could result in the production of Goertler-type (over a concave wall) or Dean-type (in a curved pipe) vortices. Hence, the net effect of the Coanda surface on the ejection process is improved because the vorticity at the upstream edge of the internal channel is dissipated by the vortex chamber. Also, preconditioning of the additive by the contraction flow through the nozzle initiates the drag-reducing effect of the additive. Specifically, that effect includes the dissipation of smallscale vorticity. These separate mechanisms work together to improve the behavior of the ejected stream as it merges with the established boundary layer.

Combining the improved behavior of the ejected stream with the preconditioning of the additive during the ejection process results in a more rapid suppression of turbulence and, hence, a reduction in diffusion of the concentrated additive. In the present invention, diffusion of the concentrated additive is further reduced by preconditioning the flow just upstream of the principal ejector. Several techniques can be employed. For unsteady or complex turbulent boundary layer flows, the present invention includes a separate, sacrificial, additive ejector that is configured to eject a low concentration of additive and is located just upstream of a principal ejector. The concentration can be of order 10 parts per million by weight (wppm), since the intent is not to be effective far downstream, but only immediately upstream of and at the location where the concentration of the material from a principal ejector is greatest, (i.e., where the penalty for diffusion. is the greatest). Thus, for the cost (i.e., sacrifice) of a modest amount of additive, much greater quantities of additive from the principal ejector will remain in the near-wall region.

For relatively steady flows, more simple ejectors configured as transverse grooves, properly scaled to produce a stable entrained vortex or vortex system, are positioned upstream of the principal ejector. A stable and entrained vortex system will dissipate small-scale vorticity produced at the wall and interrupt the development of the upstream boundary layer. Groove profiles that produce stable-entrained vortices, specifically for after-body separation control, have been published in the literature. In addition to properly shaping the groove, the present invention introduces small amounts of additive in order to contribute further to the stabilization of the entrained vortex.

Figure 2A:
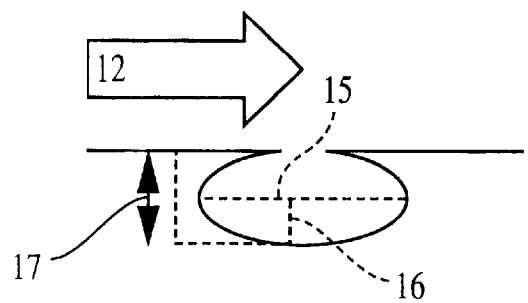
FIGS. 2A–2C present a number of optional profiles of transverse grooves that can be positioned just upstream of the ejector.
Figure 2B:
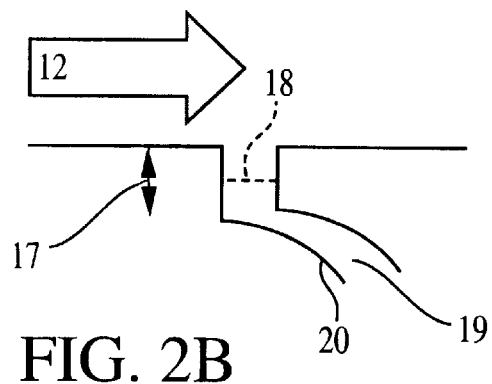
Figure 2C:
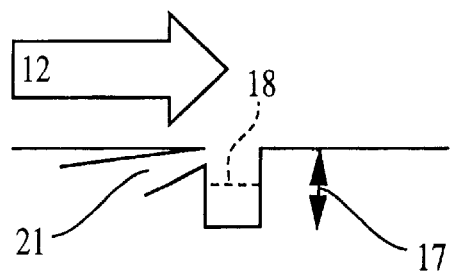

Three profiles of upstream groove configuration are given in FIG. 2. FIG. 2A is a schematic of a transverse groove cross-section of elliptical form with a major axis (15), a minor half-axis (16), and a depth (17), relative to the outer wall. This shape, when scaled properly (15>17), can be more tolerant of low levels of unsteadiness in the boundary layer than a rectangular shape. FIG. 2B is a schematic of a cross-section of a rectangular groove of width (18) and depth (17) (where 17≈18), which can be fed an additive through a nozzle (19) with a Coanda surface (20) at the bottom downstream edge of the groove. For this configuration, the addition of small amounts of additive will increase the stability of the entrained vortex. FIG. 2C is a schematic of a cross-section of a similar rectangular groove that can be fed an additive through a nozzle (21) at the top upstream edge of the groove. For this configuration, the additive expenditure rate will be slightly greater than for the configuration in FIG. 2B, but the additive will suppress small-scale vorticity in the near-wall region of the boundary layer as well as stabilize the entrained vortex. In all cases, the external flow (12) is from left to right.

In addition to these techniques, it is also possible to precondition the flow upstream by employing other drag reduction techniques just upstream of a principal ejector. These techniques include, but are not limited to riblets, drag-reducing coatings of various types, and boundary layer suction. As described in the literature, each has its advantages relative to the characteristics of the upstream flow.

Since the ejector of the present invention is much less disruptive than prior art ejector designs, it is possible to stratify different additives using tandem ejectors. Ejection of fluids of differing viscosities through multiple ejectors permits the establishment of a favorable viscosity gradient in the near-wall region, thereby enhancing system performance. For example, the ejection of fluid from a similar but smaller ejector located immediately downstream of a principal ejector and scaled for a $Q_s$ value of about one will act to displace the additive from the upstream ejector away from the wall and into the region where it is effective in reducing the level of turbulence. For gas microbubbles, this also reduces the potential of the bubbles to act on the wall as roughness elements during ejection. For both gas and concentrated solutions of polymer, it can provide a favorable rather than unfavorable viscosity gradient at the wall. The ejected fluid can be the solvent alone, for example water, or a dilute solution of the additive such that the viscosity is the same or less (such as for heated water) than the ambient solvent. When just water or no additive is used in the downstream ejector, the requirement for a nozzle can be relaxed. Since the flow rate through the downstream ejector is reduced to about one $Q_s$, the ejection velocity should be about five percent of the freestream velocity. This is about half of the ejection velocity of the larger upstream ejector. To accommodate the lower ejection velocity, the ratio of the diameter of the Coanda surface to the slot width should be increased over that of the upstream ejector to a value of 6 to 8 times the downstream slot width (26), to inhibit the development of local separation on that surface. The size of opening (11) should remain about three slot widths (26); hence, the segment between the curved wall of the chamber and edge (6) must be extended in comparison with the upstream ejector.

Figure 3:
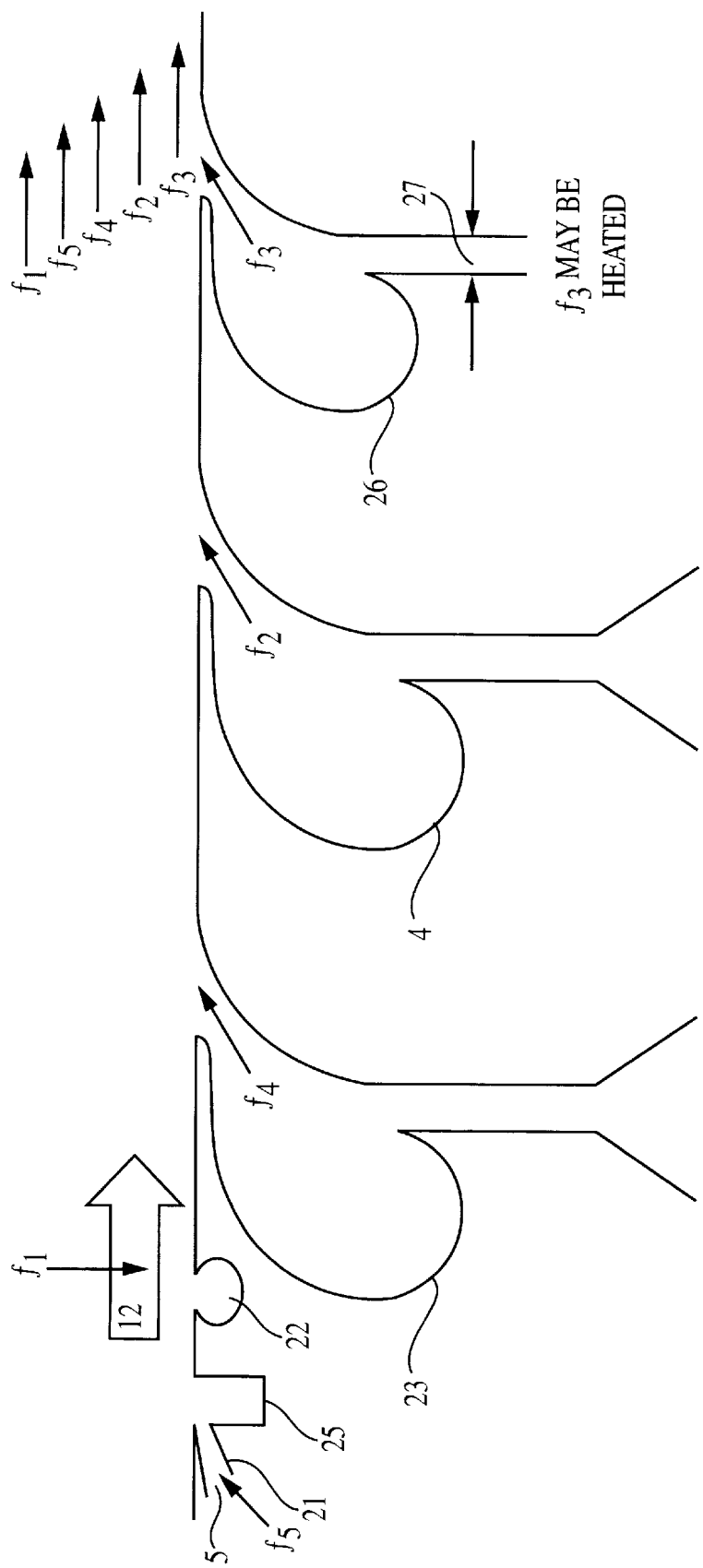
FIG. 3 is a cross-section schematic of one configuration of a triple ejector system. In this configuration, an elliptical groove is located upstream of the first ejector unit and has communication ports to the vortex chamber of the first ejector. The ports allow additive from the vortex chamber to feed the groove and thus eliminate the need for piping to the groove. A second ejector is positioned to eject a different additive under the fluid from the first ejector. Downstream of the second ejector is a smaller ejector, scaled to the mass flow rate of the fluid that will be ejected under the stratum of the fluid ejected from the upstream ejectors.
Figure 4:
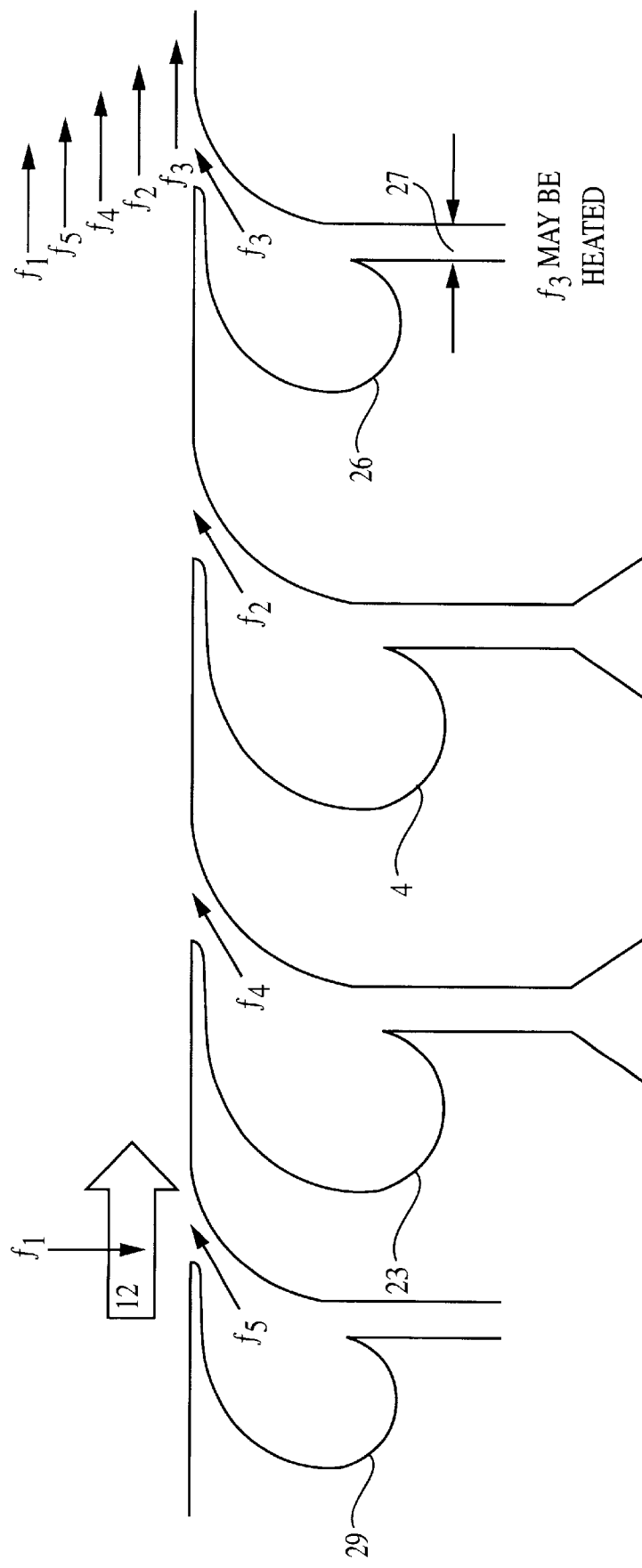
FIG. 4 is a view similar to FIG. 3; however, in place of the groove, a small sacrificial ejector is located upstream of the first ejector unit.

FIG. 3 is a cross-section schematic of one configuration of a triple ejector system. In this configuration, an elliptical transverse groove (22) is located upstream of the first principal ejector unit (23). Additive may be fed into the elliptical groove in the same manner as displayed in FIG. 2B or FIG. 2C. Depending on the character of the upstream flow, additional grooves (25) can be positioned to suppress the level of turbulence at the first principal ejector. Or, instead of the grooves, as illustrated in FIG. 4, a small sacrificial ejector 29, scaled to eject 5 to 10 $Q_s$ of additive at a concentration on the order of 10 wppm, can be positioned to suppress the level of turbulence at the first principal ejector. Or the sacrificial ejector can be a groove 25 as shown in FIG. 3 that has a fifth fluid input via a nozzle 21 at the top upstream edge of the groove, similar to the arrangement shown in FIG. 2C. "Sacrificing" this small amount of additive will reduce the level of turbulence and thus the amount of diffusion at the first principal ejector.

The fluid, $f_4$, from the first principal ejector may be a mixture of gas microbubbles which, according to the literature (see Merkle and Deutsch, for example), can be effective within 300 viscous units of the wall, i.e., further from the wall than most polymers are effective. Deutsch also reports that the microbubble layer seems to act to screen the near-wall layer from the larger structures in the outer regions of the boundary layer. Thus, multiple tandem ejectors (23) and (4) can be used to position microbubbles of different scales and polymers of different molecular weights and configurations at the stratum where they are effective. Downstream of the principal ejectors (23 and 4) is a smaller ejector (26), having a slot width $h_2$ (27) that is scaled to the mass flow rate of the fluid, $f_3$, that is ejected from this downstream ejector. When only the solvent is intended to be ejected from the downstream ejector, for example, for the purpose of establishing a favorable viscosity gradient, the requirement for a nozzle or similar device to produce a convergent laminar flow can be relaxed. However, nozzles of various configurations are often used to produce the desired scale microbubbles; hence, specific nozzle designs are likely to be required for microbubble ejection as well as for preconditioning polymer prior to ejection.

Thus, in addition to altering the rheological characteristics of the near-wall fluid, multiple ejectors can be employed to stratify additives, which are known to be effective in specific strata of the boundary layer. For example, some additives, such as microbubbles of a particular scale, are considered to be effective further from the wall than are polymers. In FIG. 3, a set of three tandem ejectors, each scaled for the desired mass flow rate, could provide a three-tiered strata of water (low viscosity), $f_3$, under a concentrated solution of polymer, $f_2$, over which microbubbles, $f_4$, are ejected. Similarly, multiple layers of appropriately scaled bubbles or multiple layers of different species of polymers can be ejected from tandem ejectors. Over these fluids flow the additive from the upstream grooves or "sacrificial slot", $f_5$, and the freestream fluid, $f_1$.

In the past, shipbuilders have concluded that high concentrations and high flow rates of additive from a single ejector system were more efficient than if the same amount of additive were ejected from multiple ejection sites distributed along the length of the hull. The increase in local skin friction produced by traditional ejectors and boundary layer blow-off, which leads to an increase in pressure drag, were contributors to this phenomena. By avoiding those effects, the present invention makes it possible to employ sets of ejectors at multiple locations along a vehicle or propulsor, and thereby optimize the distribution of additive as a function of shape and length of the wall (vehicle). Thus, very long walls may be treated without a significant loss in efficiency.

Ejectors also can be configured to energize the near-wall flow to avoid separation during changes in the freestream angle of incidence, since the ejector is adaptable to local changes in flow conditions. The post-ejection processes include the treatment of the wall to reduce diffusion of the additive downstream of the ejector, treatment of the outer flow to reduce diffusion of the additive both along the wall and around any protrusions, and the downstream ejection of either different additives or a different concentration of additive to achieve a more efficient additive expenditure rate.

What is claimed is:

1. A method of ejecting a drag-reducing substance into a first fluid in a manner that avoids disruption and "blow-off" of the first fluid and reduces the rate of diffusion of the drag-reducing substance in the first fluid to thereby increase the effectiveness of the drag-reducing substance in reducing drag of the first fluid in moving relative to a wall, said method comprising the following steps, performed in the order indicated:
 a) conditioning the drag-reducing substance by causing a second fluid, which includes the drag-reducing substance as a dispersed solid, liquid or gas microbubble and substance mixture, to flow through a nozzle that produces an axial velocity gradient within the second fluid containing the additive as a mixture or in solution, to thereby unwind, align and extend molecules of the drag-reducing substance;
 b) passing the second fluid by a vortex chamber, to establish a vortex within the vortex chamber, thereby reducing the vorticity of the second fluid;
 c) ejecting the second fluid through a first ejector, having an aperture in a wall, into the first fluid as said first fluid flows past said wall, said aperture formed to include a first Coanda surface as a portion thereof.

2. The method of claim 1, wherein the first Coanda surface is positioned, relative to the flow of the first fluid past said wall, at the downstream side of the aperture.

3. The method of claim 1, wherein said vortex chamber is positioned so as to have at least a portion thereof opposite the first Coanda surface.

4. The method of claim 1, wherein the vortex chamber includes a knife-edge in a region where the second fluid from the nozzle meets the vortex chamber.

5. The method of claim 1, wherein the vortex chamber surface forms a knife-edge in a region where the vortex chamber meets the wall.

6. The method of claim 1, wherein a region between the wall and the vortex chamber includes a second curved surface.

7. The method of claim 1, said method further comprising: ejecting a third fluid through a second ejector having an aperture that is downstream of said first ejector, the second ejector having a Coanda surface on its downstream side and a vortex chamber positioned to have at least a portion thereof opposite the Coanda surface.

8. The method of claim 7, wherein the second ejector is a different size, but is otherwise similar in design, to said first ejector.

9. The method of claim 7, wherein the third fluid has lower viscosity than said second fluid.

10. The method of claim 9, wherein the third fluid is heated, to thereby provide said fluid with a lower viscosity than if the fluid were not heated.

11. The method of claim 1, said method further comprising: ejecting a fourth fluid through a third aperture that is upstream of said first aperture, the third aperture having a Coanda surface on its downstream side and a vortex chamber positioned to have at least a portion thereof opposite the Coanda surface.

12. The method of claim 11, wherein the third aperture is a different size but is otherwise similar in design, to said first aperture.

13. The method of claim 11, wherein a groove is positioned upstream of said third aperture for the purpose of removing vorticity from the first fluid as it flows past said groove.

14. The method of claim 1, wherein a groove is positioned upstream of said first aperture for the purpose of removing vorticity from the first fluid as it flows past said groove.

15. The method of claim 14, wherein said groove is in communication with a source of a fifth fluid that is input via a Coanda surface to said groove on the downstream bottom position of the groove.

16. The method of claim 14, wherein said groove is in communication with a source of a fifth fluid that is input through a nozzle at the top upstream position of the groove.

17. A method of releasing one or more drag-reducing substances into preselected, multiple strata of the boundary layer of a first fluid flowing relative to a wall, said method comprising the following step:
 ejecting at least one drag-reducing substance through multiple apertures that are positioned sequentially along a flow path of the first fluid, wherein at least one of said apertures is in fluid communication with: a nozzle, a vortex chamber that is positioned to be activated by fluid that has passed through the nozzle so as to establish one or more vortices of the fluid in the vortex chamber, and a Coanda surface opposite the vortex chamber.

18. The method of claim 17, wherein at least one drag-reducing substance is ejected through the multiple apertures at different concentrations.

19. The method of claim 17, wherein the rates that fluids are ejected through the multiple apertures vary, depending on flow parameters of the first fluid, the desired level of drag reduction, and the length of said wall.

20. A method of ejecting a drag-reducing substance into a first fluid in a manner that reduces the rate of diffusion of the drag-reducing substance in the first fluid to thereby increase the effectiveness of the drag-reducing substance in reducing drag of the first fluid in moving relative to a wall, said method comprising the following steps, performed in the order indicated:
 a) causing a fourth fluid, having gas dispersed therein, to flow through a nozzle configured as a microbubble generator;
 b) passing the fourth fluid by a vortex chamber, to establish a vortex within the vortex chamber, thereby reducing the vorticity of the fourth fluid; and
 c) ejecting the fourth fluid through a third aperture into the first fluid as said first fluid flows past said aperture, said aperture including a first Coanda surface on a portion thereof.

21. An apparatus for ejecting a drag-reducing substance into a first fluid in a manner that reduces the rate of diffusion of the drag-reducing substance in the first fluid to thereby increase the effectiveness of the drag-reducing substance in reducing drag of the first fluid in moving relative to a wall, said apparatus comprising:

a) a nozzle that produces an axial velocity gradient within a second fluid that is passed through said nozzle;

b) a vortex chamber that is positioned to be activated, by the second fluid that has passed through said nozzle, to thereby form a vortex or system of vortices within the second fluid in the vortex chamber; and c) a first ejector having an aperture for ejecting the second fluid into a flow of the first fluid past said aperture, said aperture formed to include a Coanda surface as a portion thereof.

22. The apparatus of claim 21, wherein the Coanda surface is positioned, relative to the flow of the first fluid past said aperture, adjacent to the downstream wall of said aperture.

23. The apparatus of claim 21, wherein the vortex chamber is positioned to have at least a portion thereof opposite the Coanda surface.

24. The apparatus of claim 21, said apparatus further including, downstream of the aperture for ejecting the second fluid:

a) a nozzle that produces an axial velocity gradient within a third fluid that is passed through said nozzle;

b) a vortex chamber that is positioned to be activated, by the third fluid that has passed through said nozzle, to thereby form a vortex or system of vortices within the third fluid in the vortex chamber; and c) a second ejector for ejecting a third fluid under the flow of the first and second fluids past said second ejector, said second ejector having an aperture formed to include a Coanda surface as a portion thereof.

25. The apparatus of claim 21, said apparatus further including, upstream of said aperture for ejecting the second fluid:

a) a nozzle that produces an axial velocity gradient within a fourth fluid as the fourth fluid is passed through said nozzle; b) a vortex chamber that is positioned to be activated, by the fourth fluid that has passed through said nozzle, to thereby form a vortex or system of vortices within the fourth fluid in the vortex chamber; and c) an aperture for ejecting the fourth fluid into flow of the first fluid past said aperture and above the flow of the second fluid downstream of said aperture, said aperture formed to include a Coanda surface as a portion thereof.

26. The apparatus of claim 25, said apparatus further including, upstream of said first ejector:

a) a nozzle that produces an axial velocity gradient within a sacrificial fifth fluid as it is passed through said nozzle;

b) a vortex chamber that is positioned to be activated by the fifth fluid that has passed through said nozzle, to thereby form a vortex or system of vortices within the fifth fluid in the vortex chamber; and c) an aperture for ejecting the fifth fluid into the flow of the first fluid past said aperture, said aperture formed to include a Coanda surface as a portion thereof.

27. The apparatus of claim 21, wherein a groove is positioned upstream of said aperture.

28. The apparatus of claim 27, wherein the groove that is positioned upstream of said aperture includes a conduit and nozzle for receiving and conditioning a fifth fluid which includes a drag-reducing substance.

29. The apparatus of claim 28, wherein said conduit includes a Coanda surface.

30. The apparatus of claim 27, wherein said groove has an elliptical cross-section.

31. The apparatus of claim 21, said apparatus further including upstream of said first ejector:

a) a nozzle that produces an axial velocity gradient within a sacrificial fifth fluid as it is passed through said nozzle;

b) a vortex chamber that is positioned to be activated by the fifth fluid that has passed through said nozzle, to thereby form a vortex or system of vortices within the fifth fluid in the vortex chamber; and c) an aperture for ejecting the fifth fluid into the flow of the first fluid past said aperture, said aperture formed to include a Coanda surface as a portion thereof.

32. A method of ejecting a drag-reducing substance into a first fluid in a manner that avoids disruption and blow-off of the first fluid and reduces the rate of diffusion of the drag-reducing substance in the first fluid to thereby increase the effectiveness of the drag-reducing substance in reducing drag of the first fluid in moving relative to a surface, said method comprising the following steps, performed in the order indicated:

a) conditioning the drag-reducing substance by causing a second fluid, which includes the drag-reducing substance as a dispersed solid, liquid, or gas microbubble and substance mixture, or liquid and gas microbubble mixture, to flow through a nozzle that produces an axial velocity gradient within the second fluid containing the additive as a mixture or in solution, to thereby unwind, align and extend molecules of the drag-reducing substance;

b) passing the second fluid by a vortex chamber, to establish a vortex within the vortex chamber, thereby reducing the vorticity of the second fluid;

c) ejecting the second fluid through a first ejector, having an aperture in said surface, into the first fluid as said first fluid flows past said surface, said aperture formed to include a first Coanda surface as a portion thereof.

* * * * *

UNITED STATES PATENT AND TRADEMARK OFFICE
CERTIFICATE OF CORRECTION

PATENT NO. : 6,357,374 B1  Page 1 of 1
APPLICATION NO. : 09/621611
DATED : March 19, 2002
INVENTOR(S) : Moore et al.

It is certified that error appears in the above-identified patent and that said Letters Patent is hereby corrected as shown below:

In column 2, at line 46, change "flow were 20" to -- flow that were 20 --;
In column 3, at line 31, change "$y^+$value" to -- $y^+$ value --;
In column 3, at line 66, change "Royal Institute" to -- Royal Institution --;
In column 4, at line 52, change "B. A. Barbarnal" to -- B. A. Barbanel --;
In column 5, at line 8, change "boundary" to -- Boundary --;
In column 5, at line 33, change "C. S. Well" to -- C. S. Wells --;
In column 6, at line 20, change "Koziov" to -- Kozlov --;
In column 7, at line 23, change "wellknown" to -- well-known --;
In column 10, at line 14, change "Goertler-type" to -- Görtler-type --;
In column 10, at line 33, change "Goertler-type" to -- Görtler-type --;
In column 10, at line 40, change "smallscale" to -- small-scale --;
In column 11, at line 33, change "to riblets" to -- to: riblets --;
In column 12, at line 19, change "FIG. 2C ." to -- FIG. 2C. --; and
In column 15, at lines 39-40, change "nozzle . . .activated," to
-- nozzle;
b) a vortex chamber that is positioned to be activated, --.

Signed and Sealed this

Twenty-ninth Day of January, 2008

JON W. DUDAS
*Director of the United States Patent and Trademark Office*